United States Patent [19]

Hunkar

[11] 3,941,534
[45] Mar. 2, 1976

[54] INJECTION MOLDING CONTROL SYSTEM
[75] Inventor: Denes B. Hunkar, Cincinnati, Ohio
[73] Assignee: Hunkar Laboratories, Inc., Cincinnati, Ohio
[22] Filed: Oct. 19, 1973
[21] Appl. No.: 407,994

Related U.S. Application Data
[63] Continuation-in-part of Ser. No. 194,224, Nov. 1, 1971, Pat. No. 3,767,339.

[52] U.S. Cl. .................. 425/145; 425/149; 264/40; 91/461
[51] Int. Cl.² ........................................... B29F 1/06
[58] Field of Search.................... 425/136, 145, 149; 164/154, 155; 91/461

[56] References Cited
UNITED STATES PATENTS

| | | | |
|---|---|---|---|
| 2,804,752 | 9/1957 | Norman et al. | 425/145 |
| 3,555,969 | 1/1971 | Shah | 91/461 |
| 3,555,970 | 1/1971 | Borgeson et al. | 91/461 |
| 3,628,901 | 12/1971 | Paulson | 425/136 X |
| 3,721,512 | 3/1973 | Ma et al. | 425/149 |
| 3,726,334 | 4/1973 | Sallberg et al. | 425/145 |
| 3,767,339 | 10/1973 | Hunkar | 164/154 X |

*Primary Examiner*—R. Spencer Annear
*Attorney, Agent, or Firm*—Wood, Herron & Evans

[57] ABSTRACT

An injection molding control provides for the programmable control of ram velocity as a function of the position of the ram through closed-loop feed-back of the measured actual velocity. Closed-loop feed-back of the actual mold cavity pressure overrides the velocity program in an analog fashion to stop the ram when a preset cavity pressure has been attained associated with a desired charge size. Programmable control of the ram screw speed and/or back pressure during injection as a function of ram position or time is used to impart a predetermined temperature profile to the charge along the length thereof while it is in the barrel prior to injection. This enables controlled variation in density of the molded article throughout its volume to achieve desired levels in preselected characteristics such as surface wear, gloss, resolution and the like. A closed-loop servo system responsive to hydraulic pressure on the ram, including a flow divider valve which meters flow between the ram pressure chamber and a drain tank, provides accurate and continuous control of injection, hold and back pressure to enhance product quality; smooth pressure transitions between different ram pressure levels utilized in the molding cycle to avoid undesirable effects due to ram overshoot; simultaneous flow and pressure increase during injection when ram velocity falls below programmed level thereby avoiding sluggish response characteristics when restoring ram velocity; and reduction in number of hydraulic components required to effect the injection, hold, and back pressure functions.

13 Claims, 4 Drawing Figures

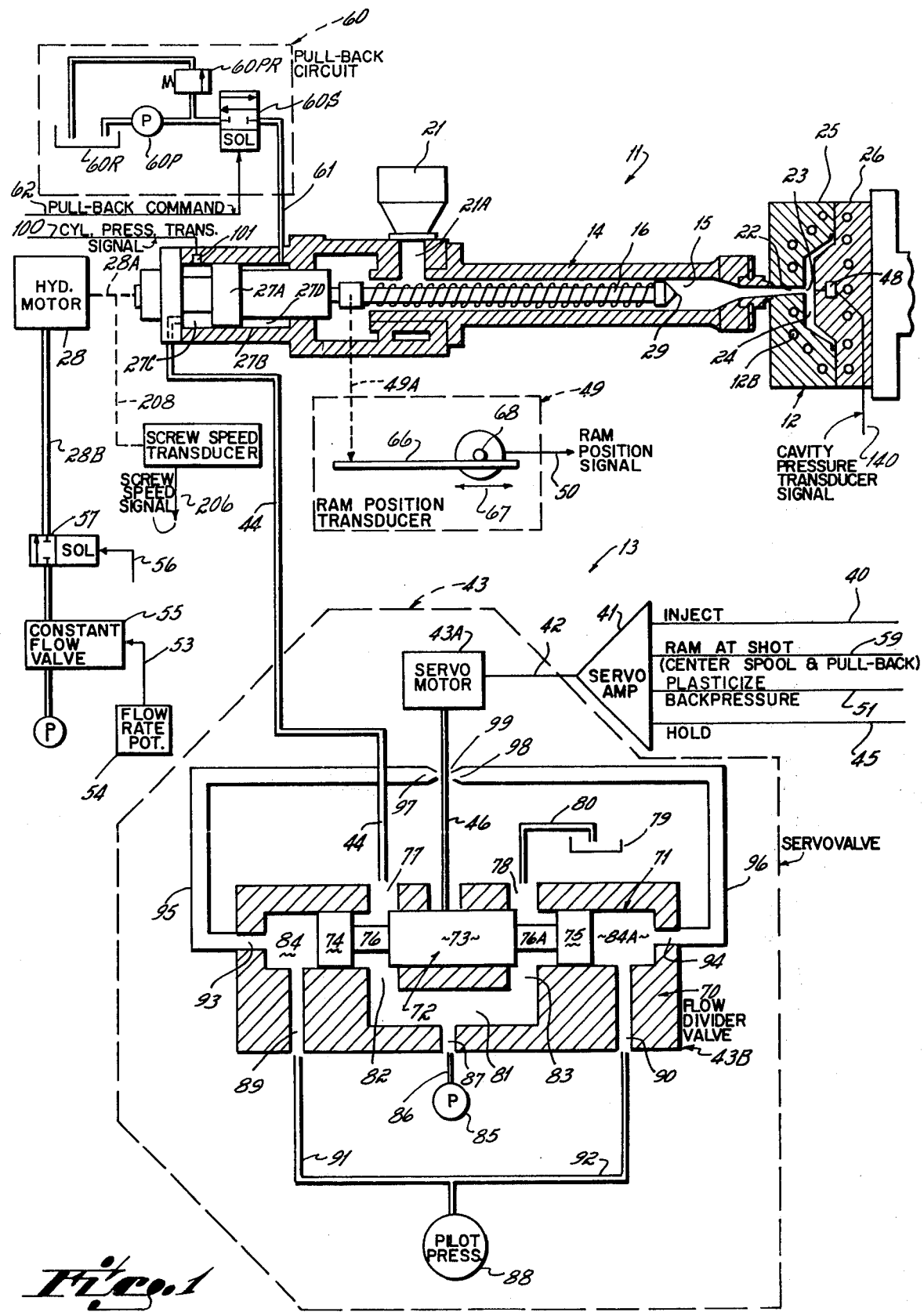

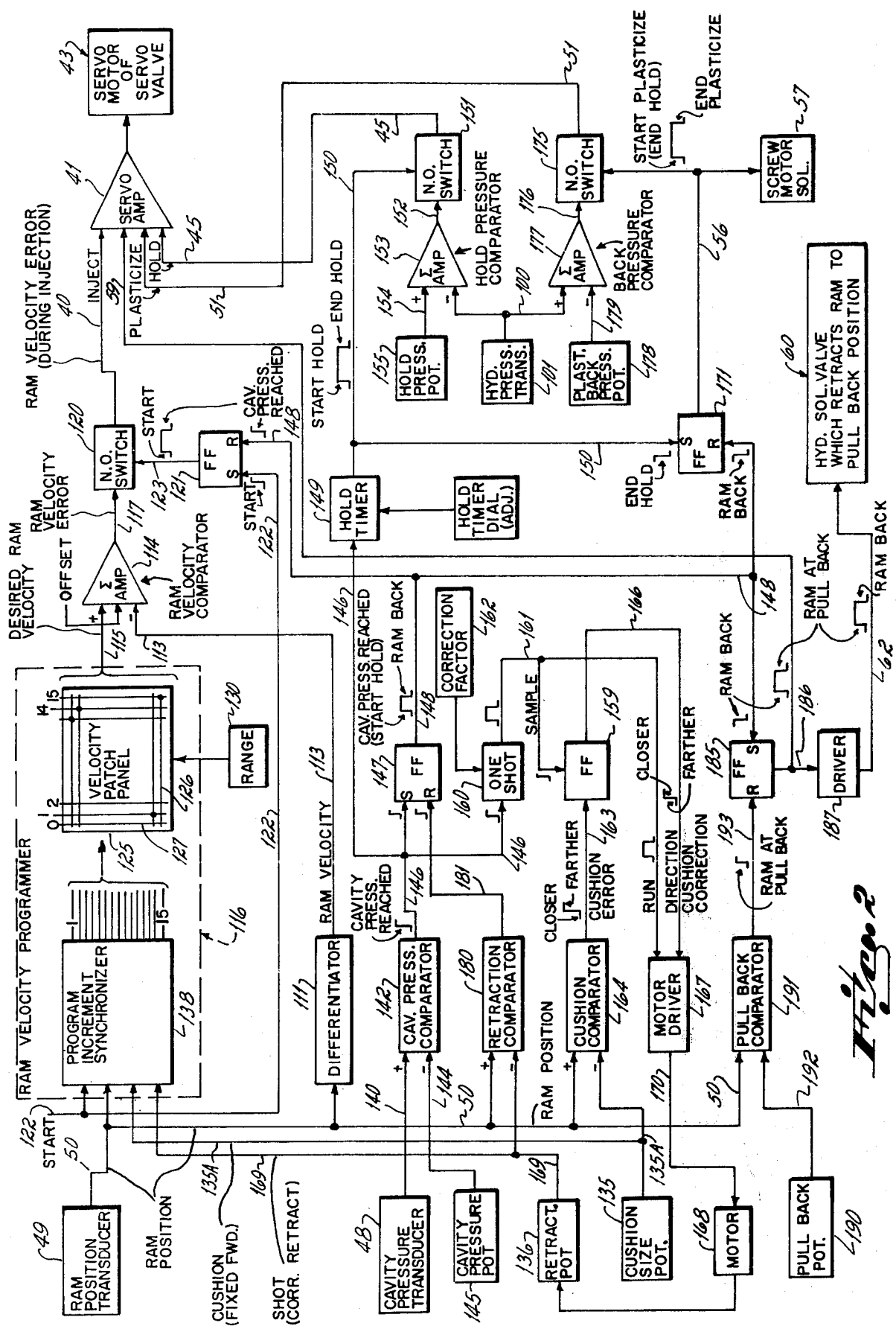

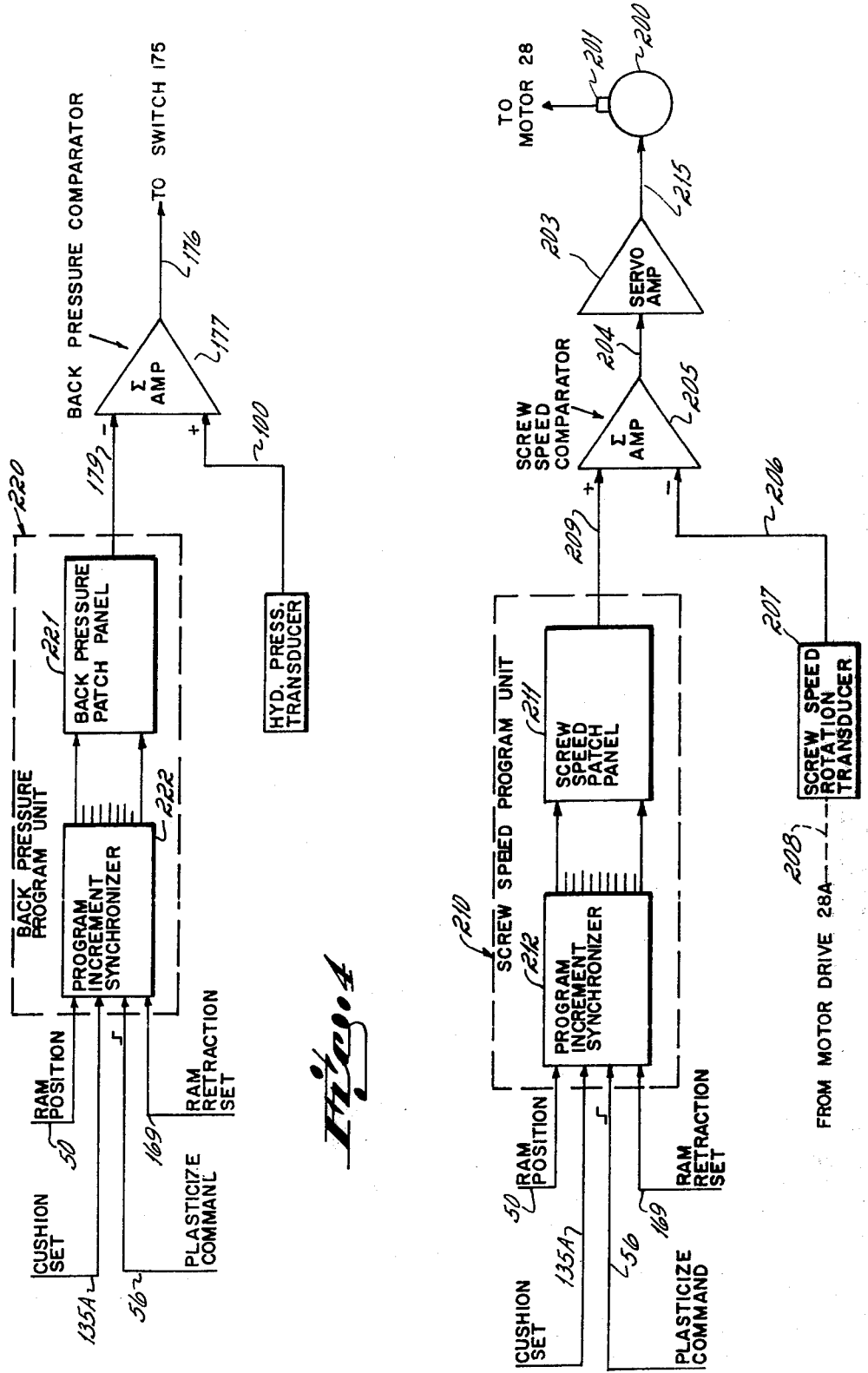

INJECTION MOLDING CONTROL SYSTEM

The present invention relates to controls for injection molding machines. This application is a continuation-in-part of the copending U.S. patent application of Denes B. Hunkar for "Injection Molding Control", Ser. No. 194,224, filed Nov. 1, 1971 now U.S. Pat. No. 3,767,339.

BACKGROUND OF THE INVENTION

In the art of injection molding, machines are employed which cyclically supply plasticized material to a mold. These machines are usually of the reciprocating screw type in which the material to be molded is plasticized through the application of heat and the mechanical working of the material by the rotation of a screw within a plasticizing chamber. As the plasticized material is accumulated within the chamber, the screw, which also serves as a ram, retracts away from an injection orifice communicating with a mold cavity. When enough plasticized material has been accumulated, the ram advances toward the orifice in an injection stroke to inject the plasticized material into the mold.

One of the general problems in molding articles is that of insuring that the mold is filled properly with material. Because frequently the molds are quite intricate and irregular in shape, the material tends to flow through the mold in an erratic manner, first flowing into one region then another, and sometimes prematurely solidifying, blocking the flow to certain portions of the mold. This affects the surface finish of the objects and causes non-uniform density and irregular shrinkage of the objects. The rate at which the material flows through the passages of the molds will cause a change in the temperature and thus the viscosity of the material as it flows. By controlling this rate, the filling of the mold can be controlled to some degree. It has been found that injection of material into the molds at a precise programmed rate will greatly enhance the quality and uniformity of the molded products.

To achieve this, it has been attempted in some prior art systems to program the pressure exerted on the ram in order to achieve a more desirable flow pattern into the mold cavity. Some of these prior art devices have attempted to program this injection rate on a time basis. This has, however, not been entirely satisfactory, particularly in view of the fact that the flow rate into the mold is dependent on several variable factors, such as the viscosity of the material which is being injected and on various pressure fluctuations within the hydraulic ram driving system. Other systems have attempted to program this injection rate by mechanically synchronizing the position of the valve which supplies fluid to the ram directly to the position of the ram by mechanically actuating cam followers and switches. This again has not entirely overcome the injection rate problem in that intervening variables affect the relationship between the injection rate and the valve position.

It is one principal objective of the present invention to overcome the problems of the prior art and to more precisely control the flow rate of material into the mold in a precise programmed fashion.

Accordingly, the present invention as set forth in the parent application and the improvement set forth herein provides a means for programming the injection rate of material into the mold through the programming of the velocity of the ram. The present invention incorporates a velocity program module which operates to control the ram velocity as a function of the position of the ram in direct response to a closed loop feedback signal representative of the actual ram velocity.

The advantage of this particular aspect of the present invention is to overcome certain uncontrollable variables which affect the velocity of the ram such as the material viscosity and hydraulic system variables. Further advantages of this aspect of the invention are the ability to reduce "jetting", "blush" and warping of the product. For example, when mold filling starts too rapidly, material shoots into the empty mold and solidifies. This phenomenon is known as jetting and can be eliminated by the invention. Also, it has been found that surface stress is generally dependent on flow surface velocity, which is in turn dependent on a combination of the flow surface area of the material and the material flow rate. Irregular stresses can cause product warping. In accordance with the present invention, these irregular stresses and resultant warping are eliminated by precisely controlling ram velocity.

Another problem encountered by those systems of the prior art which have attempted to program the flow rate of material into the mold has been that the program has been inalterably tied in to the exact ram position. However, when the density and viscosity of the material vary, it is desirable to expand or contract the program or to alter the end points of the program in relation to the position of the ram so that the program need not be materially altered nor the mechanical linkages be moved on the machine.

It is another object of the present invention to provide a velocity program means which will provide velocity programming as a function of ram position but which will allow the program to be alterably associated with the actual position of the ram through simple adjustments within the programming module.

Accordingly, the present invention as set forth in this and the parent application provides a means which will associate a predetermined velocity control signal with a specific relative domain of the ram stroke and which will furthermore automatically divide the entire operable ram stroke into a plurality of distinct regions. The specific embodiment of the present invention will automatically divide a portion of the ram stroke between two arbitrary selectable end points and to associate the function directly to these regions. As these end points are moved for any reason, the present invention further provides that the program be automatically revised to redivide the new ram stroke domain into the same fixed number of regions and to associate the programmed velocity function with these corresponding regions. Since it may be necessary to revise the end points of this domain to accommodate for varying viscosity or density of the material to be molded, thereby lengthening or shortening the ram stroke, by the provision of the present invention, each portion of the ram velocity program will be directly related to the actual quantity of material fed as the stroke is varied to accommodate material density rather than in previous systems where the program was directly tied to fixed positions of the ram.

Another problem encountered in the prior art has been the difficulty in maintaining a predetermined flow rate into the mold while simultaneously insuring that the fill pressure of the mold cavity does not exceed certain critical values. If a critical value is exceeded, it is found that material will extrude from the junctures of the mold, resulting in what is referred to as a "flash". This not only reduces the actual material within the mold, but results in many cases in imperfect finish of the molded object and undesirable defect in the part.

It is a further objective of the present invention to provide means for insuring that the critical pressure of the mold is not exceeded when a precise injection rate program is employed.

Accordingly, the present invention provides means for monitoring the pressure within the mold cavity and utilizing this pressure to override the velocity program at the end of the injection stroke to limit the amount of material compressed in the mold to some desired value. Furthermore, the present invention provides for a closed loop feedback of the pressure signal from the mold cavity and the comparison of the signals of predetermined value and utilizing the result of this comparison in an analog fashion to override the velocity program. The overriding of the pressure in an analog fashion provides for more precise control of the servo valve which is supplying fluid to the ram, to regulate the deceleration of the ram while preventing loss of control and overshoot of the valve spool element, which may introduce an unpredictable effect on the final pressure within the mold.

Another major area wherein problems arise in the injection molding of objects is the difficulty in insuring that the objects produced fall within high dimensional and weight tolerances. It is important that objects be made in successive molding cycles of the machine in a highly predictable and repeatable manner.

One of the more critical problems in attaining precise repeatable articles of high dimensional and weight tolerances has been the phenomenon involving shrinkage of the molded article upon cooling. This shinkage is generally inversely related to the pressure and compressed density of the material within the mold at the time the mold is filled. In order to overcome these problems, some prior art attempts have been made to regulate the pressure within the mold at the time that it is filled. Another common practice in the art is to provide a cushion of material at the orifice of the extrusion device upon which a steady holding pressure is exerted so that material is forced into the mold to accommodate for the shrinkage of the material within the mold. However, as the mold cools, it becomes increasingly difficult to control the pressure within the mold cavity by the exertion of pressure by the ram against the cushion. One reason that this practice has not been wholly successful is that, as the viscosity of the material changes, the density of the material varies and thus the cushion size varies from cycle to cycle. Thus, the effect of the holding pressure operating through the cushion has differing effects from cycle to cycle upon the material within the mold cavity, and thus the density or weight and ultimate shrunk dimension of the molded products varies from cycle to cycle.

The factors which result in changes in viscosity and its effects on the molded material are discussed in detail in the copending application of the inventor of the subject matter of this application, filed Sept. 15, 1971, and entitled "Extruder Control System", now U.S. Pat. No. 3,759,648.

It is another important objective of the present invention to provide means for controlling the shrinkage of the objects molded from cycle to cycle in a precise and repeatable manner, and furthermore to control in a precise manner the quantity of material extruded to the mold in each cycle of operation. More particularly, it is an objective of the present invention to overcome the cycle to cycle effects of variable changes, such as the viscosity of the molded material.

Accordingly, the present invention, as set forth in this and the parent application, provides means of maintaining the cushion developed at the end of each injection stroke constant from cycle to cycle and furthermore provides additional means for insuring that the mold cavity fill pressure is also maintained constant from cycle to cycle. In addition, this constant pressure and constant cushion coexist at the same time in each cycle so that a precise pressure and volume relationship exists. This insures that a precise quantity of material, which is dependent on the combination of pressure and volume factors, is the same in each molding cycle. By maintaining the constant pressure in this manner, and by maintaining the constant cushion length through which a holding pressure applied by the ram is exerted, the cooling and consequent shrinkage characteristic of each product will be maintained in very close tolerances from cycle to cycle.

More particularly, the present invention provides a means for measuring the cushion length in each cycle of operation and for feeding this information in closed-loop feed-back manner to a control circuit which affects the cushion length during the next succeeding cycle of operation in a manner which will tend to maintain this cushion dimension constant from cycle to cycle. More particularly, the present invention provides means for measuring the cushion length at the precise instant that the cavity pressure has attained a predetermined value and for comparing this measured cushion dimension with a predetermined dimension. Furthermore, the present invention provides for utilizing the information derived in comparison of the actual and standard cushion dimensions to vary the shot size, or the retracted position of the ram at the beginning of the injection stroke, in the next injection cycle in a manner which will tend to correct for differences between the measured actual cushion dimension and the predetermined desired cushion dimension. Furthermore, the present invention provides means for setting a predetermined correction factor to a ram stroke so that, upon each comparison of the cushion dimension, the shot sizes vary by a predetermined fixed amount.

The automatic shot size correction capability which the present invention provides yields a particular advantage in allowing the injection molding machine to compensate for slowly varying changes in material density and viscosity and also provides means to automatically correct for any improper setting of the shot size by the operator and to allow for only a rough initial setting which will be automatically followed by the adapting of the machine to the optimum shot size for the given product being molded.

Furthermore, the effect of the present invention is to provide precise control, not only of pressure, but volume and temperature at the time of mold filling. By this provision, it is possible with the present invention to precisely control part size by adjustment of cavity pressure. This has not been provided before by any system of the prior art since, because of other uncontrollable variables, no prior art system has provided the precise relationship between part size and cavity size.

Furthermore, an additional objective of the present invention is to provide means which are economical and efficient to adapt an injection molding machine to complete computerized control.

Accordingly, the present invention provides a programming module which may serve as an interface between a conventional injection molding machine and a computer. To achieve this, the present programming module of the present invention undertakes to furnish and control those aspects of an injection machine operation which are peculiar to the injection molding process and the particular machine being used and, in addition, the particular molded object which is being used and formed. In this manner, sophisticated computer master process controls may be used without the necessity of programming these computers to the particular characteristics and properties of different injection molding machines.

Another problem encountered in injection molding is the phenomenon known as blush. This occurs when the cavity pressure is released too rapidly while the material is still molten. In many cases it is desirable to fill a cavity to a relatively high cavity pressure and then to relieve to a somewhat reduced holding pressure which is sustained until the material solidifies. In lowering the pressure to the holding pressure, the ram will normally retract some finite dimension. If the pressure is dropped too rapidly, the ram will tend to overshoot in this retracted position.

It is one of the objectives of the present invention, and particularly of the improvement disclosed herein, to alleviate this problem by controllably decreasing from the cavity pressure to the holding pressure along a ramp of limited slope.

Accordingly, the improvement of the present invention provides means for switching the ram pressure from the relatively high preset cavity pressure at the end of injection to the relatively low holding pressure in a manner which provides a smooth and gradual ram pressure decrease during the transition between injection and hold. In the preferred embodiment, this is accomplished by means of servomotor-controlled flow divider valve of the shiftable spool type which, in a controllable manner dependent on spool position, divides the flow from a pump between the ram pressure chamber and a drain tank. Since spool position, which is accurately controlled by a servomotor, establishes the operating pressure, and any positional shift thereof to alter pressure is reasonably smooth, change in pressure from one level to another during transition from injection to hold occurs in a gradual manner, avoiding problems associated with ram overshoot occasioned by a sudden pressure drop.

A further advantage of using a flow divider between the ram pressure cylinder and the drain tank, particularly in a system where ram velocity is programmed, is that the response of the system to a sudden resistance to ram motion, and hence decrease in ram velocity below the programmed level, is significantly improved over prior systems. More particularly, in this invention when a decrease in ram velocity below the programmed level is sensed and the flow divider spool shifted, to increase fluid flow to the ram, there is a simultaneous and complementary increase in blockage of the flow path to the drain tank. As a consequence, the pressure of the hydraulic fluid increases concurrently with the increase in flow rate to the ram, assuring that the increased flow to the ram will occur at a pressure sufficient to overcome the increased resistance to ram motion which initially caused the velocity drop, thereby restoring the ram velocity to the programmed level without undue sluggishness typical of velocity control schemes heretofore used.

A futher object of the present invention is to provide means which more precisely regulate the ram fluid pressure throughout the entire molding cycle. Particularly, the present invention involves using the flow divider valve, which is connected to the ram cylinder in a closed-loop servo system during all portions of the cycle, i.e., during injection, hold and plasticize. This single flow divider valve replaces the multiplicity of valves previously required. The hydraulic equipment as disclosed in the parent application, normally included separate valves for setting the holding and plasticizing pressure. By direct servo-control of the flow divider valve and provision of electronic means for generating the proper servo signals during all phases of the molding cycle, the improvement of the present invention requires only a single valve to control the various portions of the machine cycle. In addition, it provides a great conservation of power in that unused fluid from the high pressure pump which drives the system is bypassed by the flow divider at low pressure back to the fluid reservoir, thus expending a minimum amount of energy.

A further object of the present invention is to provide a means for switching from cavity pressure control to fluid pressure control. In the first instance, cavity pressure is utilized as a feed-back control to terminate the injection stroke portion of the cycle, while fluid pressure control is used during the holding and plasticizing portions of the cycle. Separate transducers are provided in the molding cavity and in the fluid lines to generate these respective feed-back signals for the servo-control. This enables cavity pressure and ram pressure during hold and plasticization, critical parameters in an injection molding process, to be directly monitored by the mold cavity and ram pressure cylinder transducers, respectively, in turn permitting control of charge size during injection in direct response to actual cavity pressure, and control of the ram during hold and plasticization in direct response to actual ram cylinder pressure.

A further object of the present invention is the provision of means for controlling the back pressure and/or screw speed in a programmed manner as a function of ram position or time during plasticization as the ram is being retracted. This aspect is provided through the use of a separate patch panel which takes over control of the operation during the plasticizing stroke. By programming screw speed and/or back pressure during plasticization, a predetermined temperature profile can be imparted to the charge along the length thereof while in the barrel prior to injection. This enables controlled variation in density of the molded article throughout its volume to achieve desired variable level in preselected characteristics such as surface wear, gloss, resolution and the like.

These and other objectives and advantages of the present invention will be more readily apparent from the following detailed description of the drawings illustrating a preferred embodiment of the injection molding control system of the present invention, and modifications thereof, in a reciprocating screw type injection molding machine.

FIG. 1 is a diagrammatic illustration of injection molding apparatus utilizing a control system which incorporates the principles of this invention;

FIG. 2 is a schematic circuit, in block diagram format, of a control circuit incorporating the principles of this invention for controlling the injection molding apparatus depicted in FIG. 1;

FIG. 3 is a schematic circuit, in block diagram format, of a modification useful with the control circuit of FIG. 2 which includes provision for programming screw speed during plasticization; and FIG. 4 is a schematic circuit, in block diagram format, of a further modification useful with the control circuit of FIG. 2 which includes provision for programming screw back pressure during plasticization.

Conventional injection molding apparatus modified to incorporate the controls of this invention is shown in FIG. 1. With reference to this figure, the injection molding apparatus, which may in a preferred form be of the reciprocating screw type, includes an extrusion or injection apparatus 11, mold assembly 12, and an electrically controlled hydraulic circuit 13. The injection apparatus 11 includes an injection cylinder or housing 14 which is generally elongated in shape and provided with an interior cylindrical plasticizing or melt chamber or barrel 15. Axially disposed within the melt chamber 15 is a screw or ram 16 which is both rotatable about its longitudinal axis, as well as axially translatable within the barrel or plasticizing chamber 15.

The upstream end of the melt chamber 15, which is the left end thereof as viewed in FIG. 1, communicates with an input hopper 21 via a passage 21A connected to the lower end of the hopper. Molding material, typically in the form of a pelletized thermoplastic composition, is loaded into the open upper end of the hopper 21 where it is gravity-fed by passage 21A into the rearward or upstream end of the melt chamber 15 atop the rear end of the screw 16. The downstream end of the melt chamber or barrel 15, which is located rightwardly as viewed in FIG. 1, terminates in an injection nozzle 22 which at its downstream end communicates with a mold cavity 24 via an orifice 23. The mold cavity 24 of the mold assembly 12 is established or defined by a pair of cooperating mold elements 25 and 26 which are relatively movable toward and away from each other by a mold opening actuator (not shown) to allow molding of an object in cavity 24 and the subsequent removal thereof. The mold opening actuator and associated control accessories such as actuator-controlling timers, limit switches for sensing whether the mold is open or closed, etc., can be constructed in accordance with well-known techniques and form no part of this invention. For example, an illustrative timer-controlled mold-opening actuator and mold position sensing limit switch arrangement is disclosed in copending U.S. patent application Ser. No. 371,390, filed June 19, 1973, entitled "Injection Molding Control", assigned to the assignee of this application. The entire disclosure of the above-identified co-pending application is specifically incorporated herein by reference. Suitable conduits 12B are preferably provided in the mold elements 25 and 26 to facilitate the circulation of coolant to permit rapid and controlled cooling of the molded article.

The screw or ram 16 is selectively bidirectionally axially movable within the barrel 15 by a hydraulic piston 27A fixedly secured to the ram. The piston 27A is slidably movable in a hydraulic cylinder 27B. Cylinder 27B is divided into two variablsize chambers 27C and 27D by the movable piston head 27A. Rotation of the screw or ram 16 is obtained by a motor 28, preferably of the hydraulic type, which has a rotatable output shaft indicated by dotted line 28A drivingly connected to the piston 27A. A source of pressurized fluid, such as a pump P, is connected to the motor 28 via a solenoid-type electro-hydraulic ON/OFF valve 57 controlled by signals on input line 56. Preferably, a constant flow valve 55 having adjustably variable flow rates determined by the adjustably variable setting of a flow rate potentiometer 54 connected thereto by line 53 is connected between solenoid valve 57 and pump P to provide constant screw speed operation when valve 57 is open.

In normal operation, the injection molding apparatus repeatedly cycles through a predetermined molding sequence, with a molded article being produced in the mold cavity 24 during each cycle. The molding sequence of each cycle may be considered to start upon ejection of a molded article from the cavity 24. Specifically, following a suitable cooling period initiated after plasticized material has been injected by the ram 16 into the mold cavity 24 through orifice 23, the mold actuator (not shown) is operated to separate the mold elements 25 and 26 and eject the molded article, now solidified, from cavity 24. The mold elements 25 and 26 remain open for a predetermined period of time, whereupon the mold actuator returns the molding elements to their closed position shown in FIG. 1.

Following closure of the mold cavity 24 an "inject" signal on line 40 is provided to a servo-amplifier 41 by a control circuit to be described, which in a manner also to be described causes a suitable electrical control signal to be input on servo-amplifier output line 42 to an electro-hydraulic servovalve 43 causing hydraulic pressure of controlled magnitude to be input to chamber 27C via hydraulic line 44. This urges the ram 16, which has previously accumulated a predetermined charge of plasticized material in the melt chamber 15 downstream of the ram tip 29, rightwardly as viewed in FIG. 1. Rightward movement of the ram 16, particularly the tip 29, causes the accumulated charge of plasticized material for the next mold cycle to be injected into the cavity 24 in a controlled fashion via the nozzle 22 and ultimately the orifice 23.

Depending upon the nature of the inject signal on line 40 to the servo-amplifier 41, the injection pressure applied to the ram 16 during the injection phase may be maintained at a constant value or varied as a function of time or as a function of ram position. In a preferred form of this invention, the inject signal on amplifier input line 40 is such that the ram 16 moves toward the cavity 24 with a velocity which varies with ram position in accordance with a predetermined program.

Rightward injection motion of the ram 16 under the action of the servovalve 43, which in turn is controlled by the signal on inject line 40 to the servo-amplifier 41, continues until the pressure in the mold cavity 24 sensed by a pressure transducer 48 communicating with the cavity reaches a pre-set cavity pressure, whereupon a trigger signal is developed, terminating the injection phase. At this point, and in response to the trigger signal, a "hold" signal is provided to the servo-amplifier on line 45, by circuit means to be described later, causing the servovalve 43 to apply a holding pressure to the chamber 27C via line 44 of a magnitude substantially less than the injection pressure which previously existed during the injection phase when molding material was injected into the cavity. The holding pressure established by the signal to servo-amplifier 41 on line 45 is maintained for the duration of a predetermined holding interval, for example, 10–12 seconds, established by a hold timer to be described.

The trigger signal developed at the end of the injection phase when the cavity pressure reaches a pre-set limit, in addition to terminating the injection pressure and initiating the hold pressure, also operates to cause the position of the ram tip 29 to be sampled and compared with a predetermined desired position known as the "cushion". To facilitate monitoring the location of the ram tip 29 at the conclusion of the injection phase, a ram position transducer 49 is provided which is mechanically connected to the ram as indicated by dotted line 49A and provides on its output line 50 an electrical analog signal correlated to the position of the ram within the barrel. If the position of the ram at the end of the injection phase when the mold cavity pressure has reached the present value represent a ram position further from the mold cavity 24 than the predetermined cushion position, a correction signal is developed to decrease the amount by which the ram retracts during the ensuing plasticization phase, to thereby restore the cushion to the desired level at the conclusion of the next injection phase. If the sampled ram position at the conclusion of an injection is such that the ram is closer to the molding cavity 24 than the desired preset cushion, indicating the ram did not retract a sufficient distance during the preceding plasticization phase, a correction signal is provided which increases the amount by which the ram retracts during the next plasticizing operation, to thereby restore the actual cushion position to the desired preset level.

When the hold timer times out, the hold pressure supplied as a consequence of the hold signal input on line 45 to the servo-amplifier 41 terminates, and a "plasticize" or "back pressure" electrical signal is applied on line 51 to the servo-amplifier 41 by circuit means to be described. The back pressure signal causes the servovalve 43 to apply a controlled back pressure to the ram 16 via hydraulic line 44. A signal is also input on line 56 to the solenoid-controlled ON/OFF hydraulic valve 57, causing hydraulic motor 28 to rotate the ram screw 16 in a controlled manner, preferably at a constant speed established by flow rate potentiometer 54 and constant flow valve 55. The ram 16 is rotated in a direction which causes the screw threads thereof to feed material toward the orifice 23 and to accumulate material downstream of the tip 29 of the ram 16. This action, together with heat which is applied to the wall of the cylinder 14 by means not shown, causes the material to plasticize within the barrel or chamber 15.

Depending upon the nature of the electrical signal input to the servo-amplifier 41 on back pressure line 51, the back pressure applied to the ram 16 during the plasticize phase may either be maintained at a constant level, or, for reasons to be apparent hereafter, varied as a function of a ram position or as a function of time. Similarly, depending upon the nature of the control signal input to the constant flow valve 57, the rotational speed imparted to the ram 16 by the hydraulic motor 28 may be maintained at a constant level during the plasticizing phase using potentiometer 54, or may be varied as a function of ram position or as a function of time if the signal input to the constant flow valve 55 on line 53 is derived from a programmed signal source (not shown in FIG. 1) rather than potentiometer 54.

The rotation of screw 16 and accumulation of charge forward of ram tip 29 builds up pressure in the chamber 15 forward of the ram tip which eventually overcomes the back pressure exerted on the ram piston 27A by the servovalve 43 under control of the back pressure signal on line 51, causing the ram to retract away from the nozzle 22 until it reaches a predetermined retracted position at the upstream end of the chamber 15. As noted previously, the predetermined ram retraction position is corrected at the end of each injection phase as a consequence of a comparison of a preset desired ram cushion position and the actual ram cushion position at the end of that injection phase. Upon reaching the corrected ram retraction position, which position is in part determined by the output of the position transducer 49 on line 50, the back pressure provided by the servovalve 43 under control of the plasticized signal input to the servo-amplifier 41 on line 51, terminates, as does the rotation of the screw by hydraulic motor 28. Plasticization and accumulation of the desired charge forward of the ram tip is now complete.

At this point in the cycle, ram pull-back pressure is applied to the hydraulic cylinder chamber 27D via hydraulic line 61 from a ram pull-back circuit 60 which is under the control of an electrical signal input thereto on line 62. The pull-back pressure applied to piston 27A functions to retract the ram 16 a fixed amount which is designed to decompress the plasticized material located between the ram tip 29 and the orifice 23. Such decompression eliminates the need for providing a valve at the orifice 23 since the plasticized material accumulated between the orifice and the ram tip 29, once decompressed by retraction of the ram under the action of pull-back circuit 60, will not flow into the cavity 24 via orifice 23. Such flow is prevented from occurring while the charge is accumulating and prior to termination of screw rotation and retraction under the action of pull-back circuit 60, by reason of the fact that the material in the orifice 23 from the preceding injection cycle has solidified almost immediately following injection. With the material in the orifice 23 solidified shortly after completion of the injection of the charge into the cavity 24, the cavity 24 is effectively sealed with respect to the melt chamber 15 including the nozzle 22.

Coincident with application of the pull-back signal to line 62 of the pull-back circuit 60, a signal is input to the servo-amplifier 41 on line 59 to control the servovalve 43 in a manner which connects chamber 27C to a drain tank to permit fluid in chamber 27C to escape when the pull-back pressure is applied to chamber 27D.

When the ram 16 has reached the "pull-back" position following termination of screw rotation, the apparatus goes into a standby mode until a predetermined cooling time interval has been completed during which time the injected material in the mold 24 is cooling and the molded article comletes its solidification. Upon expiration of the cooling time interval, the mold elements 25 and 26 are separated and the molded article ejected from the cavity 24. The mold members 25 and 26 remain open for a predetermined time whereupon the mold elements move together to close cavity 24. At this time, a start signal is produced and the previously described molding cycle repeated to produce another molded part.

The pull-back pressure circuit 60, which retracts the ram 16 to decompress the charge accumulated forward of the ram tip 29 following plasticization, can be constructed in accordance with known hydraulic design principles. In the preferred form, the pull-back hydraulic circuit 16 includes a pump 60P having its input line connected to a fluid reservoir 60R and its output line connected to an electrically controlled valve 60S via a pressure relief valve 60PR set at the desired pull-back pressure. In operation, when a pull-back command signal is input to the pull-back circuit 60 on line 62, fluid pressurized to the setting of the pull-back pressure relief valve 60PR is input to the cylinder 27D via line 61. Obviously, other hydraulic circuits can be provided to provide the desired pull-back pressure, the description provided being only for the purpose of illustration.

Considering the servovalve 43 of this invention in more detail, it includes a servomotor 43A and a flow divider valve 43B. The servomotor 34A may be of any of the well-known and commercially available types which in response to an electrical signal input thereto on line 42 produces pivotal movement of an arm 46, known as a flapper, in either a leftward direction or a rightward direction depending upon the polarity of the input signal on line 42. The magnitude of the leftward or rightward pivotal movement of the flapper 46 is determined by the magnitude of the input signal on line 42.

The flow divider valve 43B, which may also be known commercially available types, includes a valve body 70 having an elongated bore 71 in which a spool 72 is slidably positioned. Spool 72 has a center section 73, a left-end section 74 and a right-end section 75 which have equal diameters and which are dimensioned to snugly fit for sliding motion in the bore 71. Spool members 74 and 75 are spaced from the central spool section 73 by reduced diameter rigid interconnecting elements 76 and 76A. Depending upon the position of the spool 72 within the bore 71, ports 77 and 78 which are connected to the cylinder 27C via line 44 and to a drain tank 79 via a line 80, respectively, are fully open, fully closed, or partially open to varying degrees, for reasons to become apparent hereafter. The sizes or areas of outlet ports 77 and 78 vary inversely in a complementary fashion as the spool shifts such that the blockage of port 77 increases as the blockage of port 78 decreases, and vice versa.

The flow divider valve 43B also includes a cavity 81 which connects via a passage 87 and a hydraulic line 86 to a source of pressurized fluid such as a pump 85. The cavity 81 communicates with the left-hand portion of the bore 71 via a passage 82 and with the right-hand side of the bore via a passage 83. The left and right-end regions 84 and 84A of the bore 71, which have volumes which vary in a complementary manner depending upon the position of the spool 72 in the bore 71, communicate with a source of pilot pressure 88 via passages 89 and 90, respectively, formed in the valve body 70 and hydraulic lines 91 and 92, respectively, which connect the passages 89 and 90 to the pilot pressure source 88. The pilot pressure source 88 functions under static conditions when the spool 72 is stationary to apply equalized fluid pressure to the chambers 84 and 84A with the result that no net axial force is applied to the spool 72 in either the leftward or rightward direction as a consequence of the pressurized fluid in the chambers 84 and 84A which act in opposite directions on the ends of spool sections 74 and 75. The chambers 84 and 84A communicate via passages 93 and 94, respectively, formed in the valve body 70 and hydraulic lines 95 and 96, respectively, to oppositely directed nozzles 97 and 98. The nozzles 97 and 98 are spaced apart a predetermined amount to define a gap 99 in which is positioned an intermediate section of the servomotor flapper 46, the lower end of which is mechanically connected to the central spool section 73 for feed-back purposes to be described.

In operation, when a zero level signal is input to the servomotor 43A on line 42 from the servo-amplifier 41, no torque is applied to the flapper 46 by motor 43A with the result that the flapper 46 is neither pivoted to the left nor the right, but rather assumes a central position in the gap 99 equidistant from the nozzles 97 and 98. With the flapper 46 centered in the gap 99, the back pressures in the nozzles 97 and 99, which are reflected back to chambers 84 and 84A via hydraulic lines 95 and 96 and passages 93 and 94, are equalized. As a consequence, chambers 84 and 84A which are subjected to equal pressures from the pilot pressure source 88 via lines 91 and 92 and valve passages 89 and 90 have equal pressures therein, applying no net axial force to the spool 72 in either a leftward or rightward direction. With no net axial force on the spool from the pressurized fluid in the chambers 84 and 84A and with no torque applied to the flapper 46, the flapper remains centered in the gap 99 with the spool 72 centered in the bore 71. Under such conditions ports 77 and 78 are each partially open to an equal extent with the result that pressurized fluid in chamber 81 is applied to the chamber 27C via hydraulic line 44 and to the tank 79 via line 80. Since chamber 81, which is supplied with pressurized fluid from the pump 85, is connected to the tank 79 via unblocked port 78 and line 80, the pressure applied to the cylinder chamber 27C via port 77 and hydraulic line 44 is minimal.

During the injection phase in response to an injection signal input to the servo-amplifier 41 on line 40, a control signal is input to the servomotor 43A on line 42 which functions to pivot the flapper 46 rightwardly in an amount dependent upon the magnitude of the signal. Rightward movement of the flapper 46 shifts the spool 72 rightwardly closing the port 78 and opening the port 77 in complementary fashion selectively varying amounts dependent on the signal level input to servomotor 43A on line 42 produced by the injection signal input to the servo-amplifier 41 on line 51. As a consequence of the increased blockage by spool section 73 of the port 78, which connects to the drain tank 79 via line 80, the pressure in the chamber 81 and hence in the chamber 27C of the ram actuator builds up. Simultaneously, the fluid flow to the chamber 27C of the ram actuator increases by virtue of port 77 becoming less blocked as spool section 73 moves rightwardly.

The movement of the spool 72 in a rightward direction by servomotor 43A causes the flapper 46 to move in the gap 99 to a point closer to the nozzle 98 and more distant from the nozzle 97, with the result that the back pressure in nozzle 98 increases and the back pressure in the nozzle 97 decreases in complementary fashion. With the back pressure in nozzle 98 increased and the back pressure in nozzle 97 decreased, the pressure in chambers 84A and 84 increases and decreases, respectively, applying a net axial force to the spool 72 in a leftward direction. When the net axial force on the spool 72 occasioned by the pressure differential in chambers 84 and 84A equals the force applied to the spool 72 by the flapper 46 due to the servomotor 43A as a consequence of the signal input thereto on line 42, the spool 72 reaches a condition of force equilibrium whereupon it moves no further in a rightward direction. The new equilibrium position of spool 72 locates the spool rightwardly of its center position in the bore 71 an amount dependent upon the magnitude of the signal on line 42 input to the servomotor 43A from the servo-amplifier 41 produced by the presence of an input signal on inject line 40. Consequently, the fluid flow rate to the chamber 27C of the ram actuator from flow divider 43B and the pressure thereof reach an equilibrium level correlated to the servo-amplifier inject signal level on line 40. During the injection phase, the signal level on line 40 input to the servo-amplifier 41 (which is determinative of the signal level input to the servomotor 43A on line 42, which in turn determines the extent to which the spool 72 moves to the right, and hence the flow rate and injection pressure in the chamber 27C) can be maintained at a constant value or alternatively may be programmed to vary in some predetermined manner dependent upon ram position or dependent upon time. Of course, if the injection signal to servo-amplifier 41 on line 40 is programmed to vary with ram position or time, the servo-valve spool 72 will assume successively different equilibrium positions corresponding to the successively different programmed injection signal levels input on line 40.

In a manner similar to that described above, wherein a signal on line 42 to servo-amplifier 41 produces a predetermined injection pressure and flow in the ram actuator chamber 27C, a signal input to the servo-amplifier 41 on line 45 produces a predetermined holding pressure in ram actuator chamber 27C during the holding phase of the cycle. Insofar as operation of the servo-valve 43 is concerned, the operation thereof during the holding phase is the same as during the injection phase, except that the equilibrium position of the spool 72 and hence the flow rate and pressure to the chamber 27C via line 44 is controlled by the hold signal on line 45 to the servo-amplifier 41, rather than by the injection signal on line 40 input to the servo-amplifier 41.

During the plasticizing phase of a molding cycle, a back pressure is applied to the ram actuating chamber 27C via line 44. However, instead of the ram moving toward the molding chamber 24, as occurs to a large extent in the injection phase when the plasticized charge is injected through orifice 23, and to a very small extent in the holding phase as a consequence of shrinkage of material in the mold, during the plasticizing phase the ram moves rearwardly as the charge accumulates torward of the ram tip 29. To enable the back pressure to be applied to the ram actuating chamber 27C via line 44 and yet permit the ram to move rearwardly, a control signal is input to the servo-amplifier 41 on line 51 of a polarity opposite to that present on line 40 and 45 during the injection and holding phases. The opposite polarity signal input to the plasticized line 51 produces an input to the servo-motor 43A on line 42 which moves the flapper 46 leftwardly. Leftward movement of the spool 72 partially closes the passage 77 to throttle the flow of oil from the chamber 27C flowing in line 44 as a consequence of the piston 27A moving rearwardly as the ram is urged rearwardly by the accumulating plasticized material forward of the ram tip 29. The fluid from the chamber 27C flowing through partially blocked throttling passage 77 flows into the tank 79 via passage 82, chamber 81, passage 83, and passage 78 and line 80. The extent to which the spool 72 moves leftwardly, and hence the extent to which the passage 77 is blocked and the resultant degree of throttling and level of back pressure, is dependent upon the magnitude of the plasticize signal input to the servo-amplifier 41 on line 51. The larger the signal on line 51, the greater the distance the spool 72 moves leftwardly, and hence the greater the throttling and back pressure in cavity 27C. The leftward movement of the spool 72 produced by the plasticize signal on line 51 causes the spool 72 to move leftwardly, increasing the blockage of port 77, until a new equilibrium spool position is reached. At equilibrium the leftward force applied to the spool 72 by the flapper 46 equals the net rightward hydraulic force applied to the spool 72 by the pressure differential in chambers 84 and 84A, which pressure differential is occasioned by the relatively increased back pressure in nozzle 97 and the relatively decreased back pressure in nozzle 98 produced when the flapper 46 moved closer to the nozzle 97 and further from the nozzle 98 under the action of the back pressure signal on line 51.

During the pull-back phase, the spool 72 is centered as a consequence of the input of an appropriate signal to the servo-amplifier 41 on line 59. If during the pull-back phase the pump 85 communicates with the flow divider valve chamber 81 via line 86 and port 87 as shown in FIG. 1, the setting of the pull-back pressure relief valve 60PR must be such that the force applied to the piston 27A via chamber 27D and line 61 is sufficient to overcome the force applied to the piston 27A via the chamber 27C and line 44. Alternatively, it may be desirable to place an electrically-controlled hydraulic valve in line 86 which is placed in an OFF position disconnecting the pump 85 from the chamber 81 during the pull-back phase in which event the hydraulic pressure in line 61 developed by the pull-back pressure circuit 60 during the pull-back phase would not have to overcome any forward pressure applied to the ram as a consequence of the pump 85 being connected to the flow divider 81 which has its spool 72 centered during pull-back. Such an ON/OFF valve placed in line 86 would, of course, be placed in the ON condition connecting the pump 85 to the flow divider chamber 81 during the injection and hold phases of a molding cycle when a flow of fluid into the chamber 27C via line 44 is required to substantially advance the ram to accomplish injection and very slightly advance the ram during the holding phase to maintain the cavity 24 full as the molded article shrinks. During the plasticizing phase wherein fluid flows to the flow divider 43B from the chamber 27C via lines 44 as a consequence of the ram moving rearwardly as the charge accumulates forward of the tip 29, the pump 85 can be disconnected from the flow divider chamber 81 via the OFF/ON valve placed in line 86.

At this point it should be noted that the injection, plasticize, and hold signals on lines 40, 51, and 45 are generated by comparing the actual pressure in the chamber 27C output on line 100 from a pressure transducer 101 communicating with the chamber 27C against desired injection, plasticize, and hold pressure signals provided by suitable signal sources, either fixed or programmed to vary as a function of ram position or time, as the case may be, all in a manner to be described.

Utilization of a servovalve 43 provides a number of unobvious advantages when compared to ram control schemes heretofore utilized, such as disclosed in previously referenced copending application Ser. No. 371,390. In such previously used schemes the injection, hold, and plasticize pressures were obtained by providing separate pressure sources, each usually including a pump and a pressure relief valve set to the desired pressure, which were selectively connectable to the ram actuating chamber 27C via selectively operable individual solenoid ON/OFF valves. In such prior schemes if injection pressure is desired, the solenoid valve connected to the injection pressure circuit, which as indicated includes a pump and pressure relief valve set to the desired injection pressures, is placed in an open condition, while the solenoid valves interconnecting the hold pressure and back pressure circuits to the ram chamber 27C are placed in a closed condition. When holding pressure is desired, the previously closed solenoid associated with the holding pressure circuit is opened, and the previously open plasticizing circuit solenoid is closed and the back pressure solenoid which had been closed during injection remains closed. Similarly, when back pressure is desired the previously closed solenoid associated with the back pressure circuit is opened, while the previously opened solenoid associated with the hold pressure circuit is closed and the injection pressure circuit solenoid allowed to remain closed. As is apprent, in these prior schemes a substantial duplication of hydraulic circuit components was necessary to achieve the injection, hold, and back pressure functions. By way of contrast, by using the servovalve 43 in this invention, a single flow divider 43B and servomotor 43A under common control of a single servo-amplifier 41 input with injection, hold, and plasticize signals on lines 40, 45 and 51, can be employed to provide the necessary pressures on the ram during the injection, hold and plasticizing phases. By avoiding the duplication of hydraulic circuitry heretofore necessary to accomplish the injection, hold and plasticizing functions, significant cost reductions result.

In addition to the reduction in component costs occasioned by eliminating duplication of hydraulic circuitry, a number of other advantages have been provided as a consequence of utilizing the servovalve 43. For example, a problem encountered in injection molding during the transition from the injection phase to the holding phase, known as blush, is avoided. During the injection phase the ram has applied to it a very substantial hydraulic pressure with the result that the material in the molding cavity upon conclusion of the injection phase is in a compressed state. Such a condition is desirable to provide high resolution and enhance surface finish of the molded product. However, once the mold cavity has been filled, it is desirable to relieve the pressure to the reduced "holding" pressure which is maintained until the material in the mold cavity solidifies.

In prior schemes, a switch from injection pressure to the lower holding pressure was accomplished by closing the injection pressure circuit solenoid and opening the holding pressure circuit solenoid, in the course of which the ram pressure chamber 27C is connected momentarily to a tank drain. A ram will normally retract some finite amount as a consequence of reducing the pressure from the injection pressure to the holding pressure due to decompression, and hence expansion, of the material in the molding cavity. However, if the reduction in pressure is too rapid, such as occurs when the injection pressure circuit solenoid and the holding pressure solenoid of the prior arrangements are switched and the ram cavity 27C momentarily connected to a drain tank, the ram will tend to overshoot as it retracts. If overshoot occurs, a vacuum results in the region of the mold cavity orifice with the result that some injected material is actually sucked from the cavity. This distorts the shape of the resultant molten article upon solidification, producing the phenomenon known as blush.

The servovalve 43, as used in this invention, eliminates the above-described blush problem. With the servovalve, transition from injection pressure to the holding pressure is accomplished by shifting the spool 72 to the left to decrease blockage of the opening 78 and hence reduce the pressure of fluid output from port 77 to the ram chamber 27C in a gradual and smooth manner under the control of the servomotor which is provided with an appropriate signal level on line 42 from the servo-amplifier 41.

A further advantage of using the servovalve is that the pressure applied to the ram during the injection and holding phases is significantly more accurately controlled than was possible in the prior schemes of the type disclosed in my copending application previously referenced wherein the injection pressure circuit and the holding pressure circuit each includes pressure relief valves to maintain the pressure at the desired injection and holding level. As a consequence of more accurately controlling the injection and holding pressures, better quality control and dimensional accuracy is obtained in the molded article.

More accurate control of the injection and holding pressures with the apparatus of this invention, when compared to that previously obtained with separate hydraulic pressure sources relying upon pressure relief valves for pressure regulation, is attributable to two factors. First, pressure relief valves, because they typically utilize mechanical springs to assist in accomplishing the regulation function, are inherently limited in accuracy to pressure control in the range of ±50 psi, whereas the servovalve of this invention can control the pressures to within ± ½ psi. Second, the prior pressure relief schemes, particularly those of the two-stage variety wherein the first stage includes a spring and the second includes a hydraulic valve, are sensitive to viscosity changes produced by varying temperatures of the hydraulic fluid. The amount of fluid relieved in a pressure relief valve by the second stage hydraulic valve section thereof in response to actuation of the spring-type first stage thereof varies depending upon the viscosity of the fluid. Since the amount of hydraulic fluid relieved in a single pressure relieving cycle of a two-stage pressure relief valve varies with viscosity, the resultant "regulated" hydraulic pressure varies in a manner dependent upon temperature of the hydraulic fluid.

In this invention, the hydraulic pressure transducer, which senses the actual pressure in the ram chamber 27C, can be temperature-compensated. As a consequence, the output signal from the pressure transducer which is compared against a similar signal representing the desired hydraulic pressure to determine whether the flow divider valve spool should be repositioned to adjust the hydraulic pressure, is not dependent upon temperature. Hence, the regulation of hydraulic pressure in ram chamber 27C produced by the servovalve 43 is not subject to temperature-induced errors which, as noted, do exist when two-stage pressure relief valves are used for regulation of ram pressure.

When the injection pressure is being controlled during the injection phsae in a manner such that the velocity of the ram as it moves toward the molding cavity 24 is regulated in accordance with a predetermined velocity program, another important advantage results from using the servovalve. Specifically, uder such conditions of ram control, should the ram meet increased resistance tending to reduce its velocity in the forward direction, the actual ram velocity signal, obtained by differentiating the ram position signal output on line 50 from the ram position transducer, will decrease. As a result, when the reduced ram velocity signal is compared to the desired programmed ram velocity signal, a ram velocity error signal is produced. This ram velocity error signal, when input to the servo-amplifier 41 on the inject line 40, causes the servomotor 43A to move the spool 72 in a rightward direction to increase the flow rate from the port 77 of the flow divider 43B to the ram chamber 27C via line 44, which increased flow will tend to restore the velocity of the ram to the programmed level. Simultaneously with the further opening of the port 77, which operates to increase the flow to the chamber 27C, the port 78 is further blocked, increasing the pressure in the chamber 81, in turn increasing the pressure of the hydraulic fluid flowing from the port 77 to the ram pressure chamber 27C via line 44. Thus, should the ram velocity drop below the programmed level, the ram velocity error signal input to the servo-amplifier 41 on the inject line 40 will cause the servo-actuator 43A to move the spool 73 rightwardly in a manner which simultaneously increases both the opening 77, to increase the flow rate to the ram pressure chamber 27C, and decrease the opening 78, which increases the pressure of the hydraulic fluid being input to the ram pressure chamber 27C. The simultaneous increase in flow rate and pressure of the fluid input to the chamber 27C via line 44 assures that whatever resistance exists to movement of the ram at the desired programmed velocity will be overcome without significant delay.

By way of contrast, in the prior schemes of the type wherein the ram velocity is programmed during the injection phase, the regulation of flow and the regulation of pressure in the ram pressure chamber 27C were typically accomplished with a separate flow regulator and a separate pressure regulator of the pressure relief type connected in series between a pump and the ram pressure chamber. As long as the velocity of the ram was at the desired level, the pressure in the chamber 27C was well below the maximum pressure established by the pressure relief valve. If the ram velocity suddenly decreased, the flow regulator would respond to increase the flow. However, since the pressure was well below that established by the pressure relief regulating valve, the response of the flow regulating valve to permit increased flow would not in and of itself be sufficient to restore the ram velocity to the desired level. Such velocity restoration could not result until the pressure built up to the level corresponding to the setting of the relief valve constituting the pressure regulator. Only when the pressure had built up to that corresponding to the setting of the pressure relief regulating valve would the readjustment of the flow regulating valve to permit increased flow be effective to overcome the resistance to ram movement, which had caused the ram to slow down initially, and restore the ram velocity to the desired level. Since it takes a finite time for the pump to increase the pressure from the normal operating level to the maximum pressure established by the pressure relief regulating valve, restoration of the ram velocity to the desired level in the prior schemes is rather sluggish.

A preferred form of control circuit for controlling the electro-hydraulic elements depicted in FIG. 1 is shown in FIG. 2. In this embodiment, the injection velocity is programmed such that the velocity of the ram during the injection phase is a function of ram position. Additionally, the back pressure applied to the ram during the plasticize phase is maintained at a constant preset value during the entire plasticize phase.

Considering the control circuit of FIG. 2 in more detail, the ram position transducer 49 provides on its output line 50 an analog signal having a magnitude correlated to the axial position of the ram within the barrel or cylinder 14. The ram position transducer 49 may, for example, include a rack 66 which is connected to translate bidirectionally in the direction of arrow 67 in proportion to the bidirectional translation in the axial direction of the ram 14, and a pinion 68 which drives a movable wiping contact relative to a voltage divider to provide on output line 50 an analog voltage proportional in magnitude to the position of the screw 16 in the barrel 14. The position-correlated signal from the ram position transducer 49 on output line 50 is fed to a differentiator circuit 111 which provides on its output line 113 a signal which at any instant is proportional to the instantaneous velocity of the ram. The ram velocity signal on line 113 is fed to a ram velocity comparator 114, which takes the form of a differential amplifier, where the velocity of the ram is continuously compared against a programmed velocity input to the differential amplifier on line 115 from a ram velocity programmer unit 116.

If the desired ram velocity at any instant as reflected by the magnitude of the signal on line 115 exceeds the actual ram velocity as reflected by the magnitude of the signal on line 113, a positive signal is output from differential amplifier on line 117 proportional in magnitude to the amount by which the desired ram velocity provided by the ram velocity programming unit 116 exceeds the actual ram velocity established by ram position transducer 49 and differentiator 111. Similarly, if at any given instant the actual ram velocity signal present on line 113 exceeds the desired ram velocity signal present on line 115, the differential amplifier 114 provides on its output line 117 a negative signal corresponding in magnitude to the amount by which the actual ram velocity exceeds the desired ram velocity established by the ram velocity program unit 116.

The ram velocity error signal on line 117 from the ram velocity comparator 114 is input to the inject line 40 of the servo-amplifier 41 via a switch 120 which is normally open, but which at the start of an injection cycle is placed in a closed condition for the duration of the injection phase under the control of a flip-flop 121 which responds to a start signal on line 122 produced coincident with the beginning of the injection phase by circuitry (not shown) responsive to mold closure following part ejection. The flip-flop 121 in response to receipt of a start signal on line 122 at its set terminal S is placed in a set condition, providing a logical 1 output signal to the normally open switch 120 on flip-flop output line 123. The flip-flop 121 remains in a set condition placing switch 120 in a closed position to gate the output of the ram velocity comparator 114 on line 117 to the inject terminal 40 of the servo-amplifier 41 during the entire injection phase, that is, until the pressure in the cavity 24 of the mold reaches a preset value in a manner to be described, whereupon the flip-flop 121 is reset and switch 120 open-circuited to terminate the injection signal input to the servo-amplifier 41 on line 40. During the injection phase when the switch 120 is in the closed-circuit condition, the servovalve 43 is under the control of the ram velocity comparator 114 which, as noted, provides a signal on its output line 117 correlated at any given time to the instantaneous difference between the actual ram velocity as represented by the differentiated ram position signal on line 113 and the desired ram velocity on line 115 provided by the ram velocity programming unit 116.

The ram velocity programming unit 116 functions to control the velocity of the ram 16 during the injection phase in such a manner that the ram velocity corresponds to a predetermined program which is a function of the actual position of the ram during its injection stroke. The ram velocity programmer includes a patch panel 125 which has a plurality of horizontal conductors 126 and a plurality of vertical conductors 127. The horizontal conductors 126 have associated with each a unique electrical characteristic which, when imposed on the ram velocity program unit output line 115, regulates the servovalve 43 to control the ram velocity. The signales are imposed on the line 115 by connections made on the patch panel 125 to selected ones of the vertical conductors 127. These conductors are connected, each by a different switch, to the line 115. The switches are energized in correlation with the position feed-back signal provided by the ram position transducer output on line 50 of the ram transducer 49. The ram position signal on line 50 is digitized in a manner such that it will energize only one of the vertical conductors 127 at a time. The energizing of each one of the vertical conductors 127 represents the position of the ram 16 within a specified portion of its stroke.

To achieve the digitizing of the position feed-back signal on line 50 to select the appropriate vertical conductor 127, several types of conventional circuits may be employed. One preferred type of circuit would involve the use of a shift register having a plurality of bit positions, one corresponding to each of the vertical conductors 127. Since, during an injection stroke, the ram 16 will always move in the same forward direction, trigger pulses can be derived from the position feed-back signal on line 50 as the voltage of the signal crosses a series of thresholds developed by a series of coincidence circuits. Each coincidence circuit is connected to a different voltage reference source, such as one of the nodes of a voltage divider network.

The velocity patch panel 125 is preferably provided with a velocity range selector 130 which allows multiplication of the entire function on the patch panel.

The ram velocity programmer unit 116 preferably is designed to allow the velocity program to be alterably correlated to different portions of the actual ram stroke. In the embodiment illustrated, the points represented by each of the vertical conductors 127 of the velocity program patch panel 125 are automatically evenly spaced between end points determined by settings of a cushion control potentiometer 135 and a shot-size potentiometer 136, respectively. This is achieved, for example, by providing a voltage divider network connected between the outputs of the respective potentiometers 135 and 136 which voltage divider network operates as a reference signal generator for coincidence circuits which trigger a shift register which selectively connects the points represented by the various vertical conductors 127 of the patch panel 125 to the line 115.

As noted, the vertical conductors 127 of the patch panel 125 represent different distinct regions of the stroke of the ram 116. These are connected to the outputs of a program increment synchronizer 138. The program increment synchronizer 138 operates to energize one of the vertical conductors 127 which corresponds to that portion of the stroke of the ram 16 which represents the present position of the ram as measured by the ram position transducer 49 which is connected through line 50 to the program increment synchronizer 138. This circuit may take many forms, the preferred form being the provision of a series of flip-flops in a shift register arrangement with its respective outputs connected to gates in the circuits of each one of the conductors 127 to selectively and sequentially connect each one of the conductors to the output line 115 as the ram proceeds through its injection stroke. The shift register is triggered by a series of coincidence circuits, each having inputs connected to the position signal line 50 and to a respective voltage reference. The outputs of the coincidence circuits operate solid-state switches which connect the respective vertical conductor 127 to the output 115 of the velocity programmer unit 116.

The voltage references are derived from a voltage divider network connected between the adjustable voltage input connected to the shot-size and cushion-size potentiometers 135 and 136. In this manner, the program increment synchronizer 138 functions to automatically divide the portion of the ram stroke which is defined as that region lying between the shot-size set upon the shot-size potentiometer 136 and the cushion-size set upon the cushion-size potentiometer 135 defining the opposite ends of the injection stroke. This interval is divided into a number of segments which are preferably equal in length and correspond each to a different position of the ram. When the ram is in one of these positions, the respective vertical conductor of the set 127 is actuated to select the appropriate programmed velocity from the patch panel 125 and to apply this signal to the output line 115 of the ram velocity programmer unit 116. The appropriate programmed velocity signal is derived from the horizontal conductor 126 to which the actuated one of the conductors 127 is connected by the patch panel.

In accordance with the description set forth immediately above, a suitable ram velocity programming unit 116 can be constructed utilizing the teachings of the inventor of this application in his copending U.S. patent application Ser. No. 74,644, filed Sept. 23, 1970, entitled "Control System For Comparison Extruders", now U.S. Pat. No. 3,712,772, and in his copending U.S. patent application Ser. No. 194,224, filed Nov. 1, 1971, entitled "Injection Molding Control", now U.S. Pat. No. 3,767,339, both of which are incorporated herein by reference.

To determine when the desired charge of material has been injected into the cavity 24 by the ram 16, the cavity pressure is monitored. When it reaches a predetermined level associated with a complete charge, a reset signal is provided to the reset terminal R of the flip-flop 121, resetting this flip-flop which in turn renders the flip-flop output on line 123 at a logical '0' level, open-circuiting the switch 120 which disconnects the output of the ram velocity comparator 114 from the injection input terminale 40 of the servo-amplifier 41. To accomplish this, the cavity pressure transducer 48 is provided, which transducer provides on its output line 140 an analog signal correlated to the pressure of the material in the cavity. The analog cavity pressure transducer output signal on line 140 is input to a cavity pressure comparator 142. The cavity pressure comparator 142 is also responsive to an electrical signal on line 144 established by a cavity pressure potentiometer 145 which is correlated to the desired cavity pressure associated with a complete charge. When the cavity pressure builds up to the desired level associated with a complete charge of the mold chamber 24, the comparator 142 provides a logical '1' output on its output line 146.

The logical 1 output on line 146 from the cavity pressure at the preset value corresponding to a complete charge is input to the set terminal of a flip-flop 147, setting this flip-flop to provide on flip-flop line 148 a logical 1 reset signal to the reset terminal of flip-flop 121. As noted previously, resetting of flip-flop 121 returns the switch 120 to an open-circuit condition, disconnecting the ram velocity comparator 114 from the inject terminal 40 of the servo-amplifier 41, thereby terminating control of the servovalve 43 by the ram velocity programmer 116.

The logical 1 output from the cavity pressure comparator 142 on line 146 is also input to a hold timer 149 in the form of a single-shot or monostable multivibrator to produce a predetermined duration logical 1 level output signal on line 150 corresponding in duration to the duration of the hold phase. The logical 1 hold signal on line 150 places a normally open switch 151 in a closed-circuit condition for a period of time corresponding to the duration of the hold phase.

Placement of normally open switch 151 in a closed-circuit condition connects the hold terminal 45 of servo-amplifier 41 to the output 152 of a differential amplifier, or hold pressure comparator, 153. Hold pressure differential amplifier 153 provides on its output line 152 a signal correlated in magnitude to the difference between a predetermined hold pressure signal input on line 154 provided by a hold pressure potentiometer 155 and the actual hydraulic pressure in the cavity 27C provided on line 100 from the hydraulic pressure transducer 101 located in the cavity 27C. Thus, at any given instant the magnitude of the signal gated from the hold pressure comparator 153 to the hold terminal 45 of the servo-amplifier 41 by the switch 151 which is under control of the hold timer 149 will correspond in magnitude to the difference between the desired holding pressure established by hold pressure potentiometer 155 and the actual holding pressure established by a hydraulic pressure transducer 101, and will correspond in polarity to whether the desired holding pressure is above or below the actual holding pressure with the output on line 152 being positive when the actual holding pressure exceeds the desired holding pressure and negative when the actual holding pressure exceeds the desired holding pressure. Until the hold timer 149 times out, terminating the logical 1 input signal to the normally open switch 151, the servovalve 43 will be under control of the holding pressure comparator output gated by the switch 151 to the servo-amplifier 41.

The logical 1 signal output from the cavity pressure comparator 142 at the conclusion of the injection phase, in addition to being input to the flip-flop 147 which in the manner described terminates control of the servovalve 43 by the ram velocity comparator 114 to end the injection phase, and in addition to being input to the hold timer 149 which in the manner described places the servovalve under the control of the hold pressure comparator 153 to initiate the holding phase, is also effective to correct the shot-size potentiometer 136 dependent upon the relationship of the ram tip at the end of the injection phase to the desired cushion size established by the cushion potentiometer 135. Specifically, the cavity pressure comparator 142 provides a logical 1 output at the end of the injection phase to a one-shot, or monostable multivibrator, 160 which provides on its output line 161 a logical 1 level pulse having a predetermined duration established by a dial 162. The logical 1 pulse of predetermined duration output from the one-shot 160 on line 161 strobes or samples a flip-flop 159. The condition of the flip-flop 159 is determined by the output on line 163 of a cushion comparator 164. The cushion comparator 164 provides on the output line 163 a signal correlated in magnitude and polarity to the difference between the actual ram position at the conclusion of the injection phase (when the cavity pressure reaches the preset value established by the potentiometer 145) and a desired preset cushion point established by the cushion size potentiometer 135.

If the actual ram position is closer to the molding cavity 24 than the desired ram position established by cushion potentiometer 135, indicating that the ram had not retracted sufficiently far during the preceding plasticizing cycle, the comparator 164 provides a logical 0 output on line 163 which in turn causes the flip-flop 159 to provide a logical 1 input on line 166 to a motor driver circuit 167. The logical 1 input to the motor driver 167 establishes the direction of rotation of a motor 168 which drives the potentiometer 136 such as to provide on its output line 169 a corrected signal reflecting the desired retraction point of the ram for the next cycle. The duration of operation of the motor 168 in the direction determined by the logical value of the signal on line 166 is established by the duration of the logical 1 pulse output from the one-shot 160 on line 161.

If the ram is spaced further from the cavity 24 at the conclusion of the injection phase than the desired cushion position determined by cushion potentiometer 135, the cushion comparator 164 provides a logical 1 output on its output line 163 which switches flip-flop 159, providing a logical 0 signal on line 166 to the motor driver circuit 167. The logical 0 signal on line 166, in combination with the predetermined duration logical 1 pulse on line 161, places a signal on motor driver output line 170 to the motor 168 which drives the shot-size potentiometer 136 in a direction such that the output signal on line 169 will result in ram retraction during the succeeding cycle to a lesser extent than the preceding cycle.

Thus, when the one-shot multivibrator 160 is energized, the motor 168 is driven a finite rotational distance as determined by the width of the multivibrator pulse as set by the dial 162. This energizes the motor 168 which is connected mechanically to the shot-size potentiometer 136. Thus, by a direct close loop feedback comparison of the cushion size as actually measured at the instant the cavity is filled with that set upon the cushion potentiometer 135, the shot-size control potentiometer 136 is corrected by a fixed increment in each cycle depending on whether the cushion size on the previous cycle was longer or shorter than the desired value. Thus, the closed loop feed-back system is provided which maintains the cushion size constant through control of the retracted position as set by the shot-size dial potentiometer 36.

The manner in which the ram retraction point is corrected at the end of each injection cycle in response to the comparison of the actual ram position with the desired cushion size in the preferred embodiment herein, is analogous to the manner in which retraction point correction is accomplished in the previously referenced copending application Ser. No. 371,390, incorporated herein by reference. In that application shot-size correction is dependent upon a comparison of the desired cavity pressure and the actual cavity pressure at the end of an injection cycle which terminates when the ram reaches a predetermined forward point, rather than a comparison of actual ram position against a preset cushion point.

When the hold timer 149 has timed out, and control of the servovalve 43 by the hold pressure comparator 153 has been terminated by return of switch 151 to its normally open condition, the hold phase terminates and the plasticizing phase begins. Initiation of the plasticizing phase is accomplished when the hold timer output pulse on line 150, to which the set terminal S of the flip-flop 171 is connected, reverts to a logical 0 level, setting flip-flop 171. Setting of the flip-flop 171 provides on flip-flop output line 56 a logical 1 signal to initiate the plasticizing phase. The logical 1 signal output from the flip-flop 171 on line 56 is input to the screw motor control valve 57 to initiate rotation of the ram screw.

Additionally, the logical 1 signals output from flip-flop 171 on line 56 is input to a normally open switch 175, placing this switch in a closed-circuit condition to connect the plasticize terminal 51 of the servo-amplifier 41 to the output line 76 of a back pressure comparator 177. The back pressure comparator 177 continuously compares a predetermined desired back pressure established by a back pressure potentiometer 178 input on line 179 against the actual back pressure monitored by the transducer 101 in cavity 27C, the output of which is provided on line 100. The back pressure comparator 177 provides a signal at its output having a polarity and magnitude correlated at any given time to the instantaneous difference between the desired back pressure and the actual back pressure. If the actual back pressure exceeds the desired back pressure, a positive signal on line 176 is provided having a magnitude correlated to the size of the difference, while a negative signal correlated in magnitude to the size of the difference is provided on line 176 if the desired back pressure exceeds the actual back pressure.

The output from the back pressure comparator 177 is gated by the now closed circuit switch 175 to the servo-amplifier input terminal 51 for controlling the servomotor 43. Thus, during the plasticize phase the servomotor 43 is under the control of the output of the back pressure comparator 177 which continuously monitors the relationship of the actual hydraulic pressure in the chamber 27C and the desired back pressure established by the potentiometer 178. The servomotor 43 remains under the control of the back pressure comparator 177 until the flip-flop 171 is reset when the ram retracts to the corrected shot position established by the shot-size potentiometer 178, which shot-size potentiometer was corrected during the beginning of the holding phase in accordance with the difference between the actual ram position at the end of the injection phase when the cavity pressure reaches the preset value and the desired preset cushion position.

To determine when the ram has reached the desired corrected retracted shot position, a retraction comparator 180 is provided which is responsive to the output of the ram position transducer 49 on line 50 and the output of the retraction potentiometer 136 on line 169 correlated to the desired corrected ram retraction point. When the ram has retracted to the correct shot retraction point established by the shot-size potentiometer 136, a logical 1 signal level is output on line 181 to the reset terminal R of the flip-flop 147 resetting this flip-flop. This terminates the logical 1 signal on line 148 from flip-flop 147 which in turn resets the flip-flop 171 which has its reset terminal R connected to flip-flop output line 148. Resetting of the flip-flop 171 returns the level of the signal on the output lines 56 thereof to a logical 0 value, terminating the end of the plasticizing phase. This logical signal on line 56 turns off the screw motor valve 57, terminating rotation of the screw, as well as returns the switch 175 to its normally open condition, terminating control of the servomotor 43 by the back pressure comparator 177.

The logical 1 level signal now output from the flip-flop 147 as a consequence of the ram having retracted to the corrected shot position defined by shot-size potentiometer 136 is also input to the set terminal S of a flip-flop 185 which is effective to set this flip-flop and provide a logical 1 signal level on flip-flop output line 186. The logical 1 output signal on line 186 from flip-flop 185 is input to the servo-amplifier terminal 59 causing the servomotor spool 72 (FIG. 1) to move to its centered position. With the spool 72 in the centered position, the cavity 27C is connected to the drain tank 79 allowing hydraulic fluid to drain from chamber 27C when the ram is pulled back to decompress the charge in a manner to now be described.

To accomplish ram pull-back, the logical 1 output signal on line 186 from the flip-flop 185 is input to a driver circuit 187 whose output on line 62 is connected to the pull-back electro-hydraulic valve 60S. Actuation of the valve 60S applies pull-back pressure from the circuit 60 via line 61 to the cavity 27D urging the piston 27A leftwardly to retract the ram. Pull-back motion in a leftward direction continues until the ram reaches the desired pull-back position established by a pull-back potentiometer 190. When the ram has reached the pull-back position, a pull-back comparator 191, responsive to the ram position signal on line 50 and the output on line 192 of the pull-back potentiometer 190, provides a logical 1 signal on its output line 193 to the reset terminal R of flip-flop 185 resetting this flip-flop. eset of flip-flop 185 provides a logical 0 signal on flip-flop output line 186 which via driver circuit 187 provides a logical 0 signal on pull-back valve control line 62 closing the pull-back pressure circuit valve 60S terminating the application of pull-back pressure to cavity 27D.

The resetting of flip-flop 185 and the zero level signal on flip-flop output line 186 is also input to the servo-amplifier 41 to terminate control of the servovalve 43 by the flip-flop 185. With the ram at the pull-back position and the pull-back pressure circuit valve 60S closed, the control circuit is ready to begin a new molding cycle upon receipt of a start signal on line 122 which, as discussed previously, is produced when the mold has closed following a part injection operation.

While not shown in FIG. 2, it is preferably to provide for amplification of the ram position transducer output signal on line 50, the cavity pressure transducer output signal on line 140, and the hydraulic pressure transducer output signal on line 100. Also, in addition to the range selector 130 shown associated with the velocity patch panel which permits the entire velocity program to be multiplied, it is preferable to provide the velocity comparator with an offset control 114A to facilitate additive modification of each program valve of the patch panel.

In the preferred embodiment depicted in FIGS. 1 and 2, the hydraulic screw motor 28, which is actuated during the plasticizing phase of a molding cycle, is connected to a source of pressure in the form of a pump via a constant flow regulating valve 55 and a solenoid valve 57. Valve 57, in its ON state, provides a constant flow of hydraulic fluid to the motor 28 correlated to the constant level signal on line 53 from a flow rate potentiometer 54 to drive the screw at a constant speed. At the conclusion of the plasticizing phase when the ram is retracted to the desired corrected shot point, the solenoid valve 57 is closed to disconnect the hydraulic motor 28 from the constant flow regulator 55, terminating rotation of the motor. Thus, during the entire plasticizing phase of a molding cycle in accordance with the embodiment depicted in FIG. 2, the speed of the screw is maintained at a constant value.

In accordance with a modification of the control circuit of FIG. 2, which modification is depicted in FIG. 3, the constant flow regulating elements 54, 55 and 57 which provide constant screw speed during the plasticizing phase, are replaced by a servovalve 200 constructed in accordance with the principles of the servovalve 43 shown in FIG. 1 and a screw speed programmer unit 210 constructed in accordance with the principles of the ram velocity programmer unit 116 shown in FIG. 2. The servovalve 200 has its hydraulic output port 201 connected to the hydraulic input line 28B of the hydraulic screw motor 28, and is controlled via a servo-amplifier 203 by the output on line 204 of a screw speed comparator 205. Comparator 205 has one input terminal connected via input line 206 to the output of a screw rotation speed transducer 207 which is mechanically coupled to the screw as indicated by dotted line 208. The screw speed transducer 207 provides on output line 206 an analog signal correlated to the rotational speed of the screw. The comparator 205 has its other input connected to the output line 209 of the screw speed programming unit 210. The screw speed programming unit 210 provides on its output line 209 a signal correlated to a desired programmed screw speed, which programmed screw speed varies as a function of the position of the ram. The screw speed program unit 210 can be constructed in accordance with the principles of the ram velocity programming unit 116 described in connection with FIG. 2.

Briefly, the screw speed programming unit 210 includes a screw speed patch panel 211 and a program increment synchronizer 212 which function completely analogously to the velocity patch panel 125 and the program increment synchronizer 138 discussed in connection with FIG. 2. Like the program increment synchronizer 138 of the ram velocity programming unit 116 of FIG. 2, the program increment synchronizer 212 of the screw speed programming unit 210 of FIG. 3 is provided with an input on line 50 from the ram position transducer correlated to the actual position of the ram, an input on line 135A from the cushion potentiometer 135 correlated to the desired cushion and an input on line 169 from the shot-size potentiometer 136 correlated to the corrected shot retraction point. Additionally, the program increment synchronizer 212 of the screw speed programming unit 210 is provided with an input on line 56 from the flip-flop 171 which signals the beginning of the plasticizing phase of the molding cycle. This input is analogous to the start signal input to the ram velocity programmer 116 on line 122.

With the actual screw speed signal input on line 206 to the comparator 205 and the programmed screw speed which varies as a function of ram position input to the comparator 205 on line 209, an error signal is continuously produced on line 204 reflecting the difference between the actual screw speed and the desired screw speed, which latter speed as noted varies depending upon the position occupied by the ram. The screw speed error signal on line 204 is input via the servo-amplifier 203 to the servovalve 200 on line 215, causing the servovalve 200 to alter the position of the spool in its respective flow divider valve and increase the flow output at port 201 to the screw motor 28 to bring the screw speed to the desired level established by the screw speed programming unit 210.

If desired, the hydraulic motor 28 can be replaced by a variable speed electric motor. In such case, the speed control signals output from the servo-amplifier to the servovalve of the hydraulic motor arrangement would instead be input to an appropriate electrical motor control circuit, such as of the type using SCR control.

In accordance with a further modification of the control circuit depicted in FIG. 2, which modification is shown in FIG. 4, the back pressure applied to the ram during the plasticizing phase of a molding cycle, instead of being maintained at a preset value defined by a back pressure potentiometer 178, is maintained at selectively variable levels depending upon the position of the ram. To accomplish this, the back pressure potentiometer 178 depicted in FIG. 2, which on its output line 179 provides a constant level signal during the plasticizing phase correlated to a desired constant back pressure, is substituted by a back pressure programming unit 220. The back pressure programming unit 220 provides on its output line 179 to the back pressure comparator 177 a signal correlated to the desired programmed back pressure, which programmed signal varies as a function of ram position. The operation of the back pressure programming unit 220 is analogous in structure and operation to the ram velocity programming unit 116 depicted in FIG. 2 and the screw speed programming unit 210 depicted in FIG. 3. Specifically, the back pressure programming unit 220 includes a back pressure patch panel 221 and a program increment synchronizer 222 which function in a manner similar to their counterpart elements in the ram velocity programming unit 116 and the screw speed programming unit 210.

The program increment synchronizer 222 of the back pressure programming unit 220 includes one input on line 50 connected to the ram position transducer 48 providing a signal input correlated to the actual ram position at any given point in time, a signal on line 135A from the cushion potentiometer 135 having a signal level correlated to the desired cushion, a signal on line 169 from the shot potentiometer 136 correlated to the corrected ram retraction point, and a signal on line 56 from flip-flop 171 on which a logical 1 signal appears at the beginning of the plasticizing phase. The signal input on line 56 is analogous to the start signal on line 122 input to the ram velocity programmer unit 116.

With the foregoing inputs to the back pressure programming unit 220, a signal is provided to the back pressure comparator 177 on line 179 correlated to the desired back pressure which varies in a predetermined programmed manner as a function of ram position. This input to the back pressure comparator on line 179, coupled with the input thereto on line 100 from the hydraulic pressure transducer 101, provides on back pressure comparator output line 176 a signal which at any given time is correlated to the instantaneous difference between the actual back pressure and the programmed back pressure desired for the position occupied by the ram at the point in time in question. The error signal produced by the back pressure comparator on line 176 is gated during the back pressure phase of a molding cycle by the switch 175 to the servo-amplifier 41 for controlling the servovalve 43 in a manner described in connection with FIG. 2.

The modifications of FIGS. 3 and 4 disclose separate program increment synchronizers for the screw speed and back pressure programmer units. Obviously, the program increment synchronizer used in the ram velocity programmer unit could be used to provide the necessary inputs to the screw speed and/or back pressure path panels of their respective programmer units, if desired.

By programming the speed of the screw and/or the back pressure as a function of ram position during the plasticizing cycle in accordance with the modifications of FIGS. 3 and 4, it is possible to impart varying temperature profiles to the injection charge during the plasticizing phase of a molding cycle as may be required to accomplish different results desired by the molder. For example, by increasing the screw speed and/or back pressure during the initial portion of the plasticizing phase of a molding cycle the temperature of the front of the charge, that is, that portion of the charge closest to the nozzle 22, can be increased since it is merchanically worked to a greater extent. If the temperature of the front of the charge is higher than that of the rear of the charge, that is, that portion of the charge closest to the ram tip, when the differentially heated charge is injected into the mold cavity 24, the higher temperature frontal portion of the charge will be less viscous than the rear portion thereof and hence will pack more densely. Since the frontal portion of the charge forms the surface of the molded article, the density at the surface of the article will be greater than at the interior of the article constituted by the lesser temperature rear portion of the differentially heated charge. Such a result is desirable where, for example, the molded part is to have a high resolution or have a glossy surface.

Similarly, by increasing the screw speed and/or the back pressure during the terminal portion of the plasticizing phase of a molding cycle, the rear portion of the charge can be rendered at a higher temperature than the frontal charge portion. Upon injection of the charge differentially heated in the manner indicated, the inner region of the molded article constituted by the higher temperature rear portion of the charge will pack more densely since it is less viscous. As a consequence, the resultant article has an inner region which is more dense than the surface region. This is desirable, for example, in the manufacture of plastic gears where it is desired that the gear teeth wear rather than break when stressed in operation.

Obviously, since the screw speed and/or back pressure can be varied over the entire range of ram positions during the course of its retraction in a plasticizing phase of a molding cycle, the temperature of the charge can be varied as desired along the entire length thereof. In this way, the density of the resultant molded article can be varied throughout its volume in accordance with the result desired. In some cases where a uniform elevated temperature profile is desired and the front of the charge is likely to cool appreciably while the rear of the charge is being plasticized, it may be desirable to increase screw speed and/or back pressure during the initial portion of the plasticization phase as a means of compensating for the frontal cooling.

Instead of programming screw speed and/or back pressure during the plasticizing phase of a molding cycle as a function of ram position, in accordance with a further modification of this invention the screw speed and/or back pressure during the plasticizing phase of a molding cycle can be programmed as a function of time. Obviously, if the ram retracted during the plasticizing phase of a molding cycle at a constant uniform velocity, for a given program the programming of screw speed and/or ram back pressure as a function of time would produce the same result as programmind screw speed and/or ram velocity as a function of ram position. For successive plasticizing phases of successive molding cycles the ram would always occupy at any point in time of a plasticizing cycle the same position it occupied in the previous cycle at the same point in time of the cycle.

If, however, ram velocity is not constant throughout the plasticizing phase of a molding cycle, for a given program the programming of screw speed and/or back pressure as a function of time will produce a different temperature profile in the injection charge than programming screw speed and/or back pressure as a function of ram position.

If programming screw speed and/or ram position as a function of time is desired, the program increment synchronizers should be provided with inputs correlated to elapsed time of the plasticizing cycle instead of ram position, and the beginning and ending times of a plasticizing cycle instead of the cushion point and corrected shot retraction point, respectively. In this way, and in a completely analogous fashion, the program increment synchronizer will select the desired vertical conductors of the patch panel as a function of time rather than ram position and will divide plasticizing phase intervals into equal time increments notwithstanding that the point in time when the plasticizing phase begins and the point in time when the plasticizing phase terminates may vary from molding cycle to molding cycle and/or the duration of the plasticizing phase may vary from molding cycle to molding cycle.

The preferred embodiment of the invention has been described as having a pressure transducer communicating directly with the molding cavity for the purpose of providing an electrical signal correlated to the pressure within the molding cavity. If desired, the pressure transducer may be provided in the nozzle proximate the orifice through which plasticized material enters the cavity, as disclosed, for example, in copending application Ser. No. 371,390, filed June 19, 1973, now U.S. Pat. No. 3,860,801. The pressure transducer so located, although sensing plasticized material pressure exteriorly of the cavity, would nevertheless provide an electrical signal correlated to the pressure of the plasticized material within the cavity.

The servovalve of this invention, which includes a servomotor and a flow divider valve, has been described as having a mechanical connection in the form of a flapper interconnecting the servomotor output and the spool of flow divider valve for the purpose of providing feed-back indicative of spool position. If desired, instead of mechanical feed-back of spool position, electrical feed-back means constructed in accordance with well-known techniques may be utilized to indicate spool position for the purpose of maintaining the spool in an off-center equilibrium position correlated in magnitude to the electrical input to the servomotor which drives the spool of the flow divider valve.

If desired, the servovalve may be of the "jet tube" type in which the servomotor output alters the position of a jet tube to produce a differential pressure across a spool. Spool movement is then fed back to the jet tube to return it to its centered position in which the pressure differential across the spool is reduced to zero. The spool remains in its new position as a consequence, and the jet tube remains centered due to it being in equilibrium by reason of the equal and opposite forces applied to it by the servomotor and the spool.

What is claimed is:

1. In an injection molding machine having a ram screw which advances to inject a plasticized charge of material from an injection barrel into a mold cavity and retracts while rotating to accumulate a plasticized charge, a control system for said ram comprising:
    a piston connected to said ram and a cylinder within which said piston moves,
    a flow divider valve having an inlet connected to a source of pressure fluid, a first outlet connected to said cylinder, a second outlet connected to a fluid reservoir, and movable means to simultaneously alter the sizes of said outlets in inverse relation such that when one increases the other decreases,
    a servomotor responsive to electrical signals input thereto and having an output operatively associated with said movable means for controlling the movement of said movable means in accordance with said signals,
    first and second sources of electrical signals associated, respectively, with a deviation between desired and actual ram advance during the injection phase of a molding cycle and a deviation between desired and actual ram retraction during the plasticizing phase of a molding cycle,
    means for connecting said first source of electrical signals to said servomotor during injection to control said movable means of said flow divider in a manner to advance the ram at a rate correlated to the fluid flow rate to said piston cylinder from said first valve outlet, and an injection pressure correlated to the size of said second valve outlet, and
    means for connecting said second source of electrical signals to said servomotor during plasticization to control said movable means of said flow divider in a manner to permit said ram, when said screw rotates, to retract under a back pressure correlated to the size of said second outlet and at a rate correlated to the fluid flow from said cylinder to said first valve outlet,
    whereby said ram screw, during injection and plasticization, is continuously under control of said flow divider valve in response to electrical signals input to said servomotor, to provide the desired ram advance and retraction.

2. The system of claim 1 wherein said first source of signals includes:
    a ram velocity programmer which provides electrical signals correlated to desired ram velocity,
    a ram velocity transducer having an output correlated to actual ram velocity, and
    a comparator responsive to said ram velocity programmer and said ram velocity transducer for developing a ram velocity error signal, said error signal being connectable to said servomotor during injection to control said movable means of said flow divider to advance said ram, at said desired velocity.

3. The system of claim 2 wherein said velocity programmer provides electrical signals correlated to desired ram velocity which vary as a function of ram position, and wherein said means for connecting said velocity error signals to said servomotor is under control of a molding cavity pressure monitoring circuit comprising:
    a pressure transducer responsive to the pressure in said cavity, and
    a comparator which provides a trigger signal when said cavity pressure reaches a preset limit associated with a predetermined charge, said trigger signal being operative to terminate connection of said velocity error signals to said servomotor, terminating control of said flow divider valve and servomotor by said first source of signals.

4. The system of claim 3 further comprising:
    a third source of electrical signals associated with a deviation between desired and actual holding pressure applied to said ram intermediate injection and plasticization, and
    means responsive to said trigger signal for connecting said third source of electrical signals to said servomotor to control said movable means of said flow divider in a manner to apply a holding pressure to said ram piston correlated to the amount of fluid diverted to said fluid reservoir via said second valve outlet.

5. The system of claim 1 wherein said flow divider valve includes a valve body having a bore which communicates with said inlet and first and second outlets, a spool which smoothly slides within said bore to gradually alter the outlet areas of said first and second outlets in said inverse relation, and wherein said servomotor output is operatively connected to said spool to gradually alter the areas of said outlets and provide smooth pressure transitions in said cylinder in accordance with the signals input thereto from said first and second signal sources.

6. The system of claim 5 further comprising:
    a third source of electrical signals associated with a holding pressure applied to said ram intermediate injection and plasticization, and
    means for connecting said third source of electrical signals to said servomotor intermediate injection and plasticization to smoothly shift said spool to increase the area of said second valve outlet, and apply a holding pressure to said ram piston of gradually reduced magnitude than the injection pressure, by gradually diverting an increased fluid flow to said fluid reservoir via said second valve outlet, whereby if said charge in said molding cavity is compressed at the conclusion of injection overshoot of said ram will be avoided upon decompression of said charge.

7. The system of claim 1 further comprising:
a third source of electrical signals associated with a deviation between desired and actual holding pressure applied to said ram intermediate injection and plasticization, and
means for connecting said third source of electrical signals to said servomotor intermediate injection and plasticization to control said movable means of said flow divider in a manner to apply a holding pressure to said ram piston correlated to the amount of fluid diverted to said fluid reservoir via said second valve outlet.

8. The system of claim 1 wherein said first source of signals includes:
a source of electrical signals correlated to a predetermined desired substantially constant ram velocity,
a ram velocity transducer having an output correlated to actual ram velocity, and
a comparator responsive to said constant ram velocity signal source and said ram velocity transducer for developing a ram velocity error signal, said error signal being connectable to said servomotor during injection to control said movable means of said flow divider to advance said ram at said substantially constant velocity.

9. In an injection molding machine having a ram screw which advances at a programmed velocity under an injection pressure to inject a plasticized charge of material into a mold cavity, and which simultaneously rotates and retracts under a predetermined back pressure to plasticize a charge, a control system comprising:
a piston connected to said ram screw and a cylinder in which said piston moves,
a hydraulic pressure source of variable output pressure connected to said cylinder to pressurize said piston and establish said injection and back pressures on said ram,
a first pressure transducer providing an output correlated to the pressure in said mold cavity,
a second pressure transducer providing an output correlated to the pressure in said cylinder, and
program means controlling said pressure source during injection and plasticization, said program means being responsive to said first pressure transducer output during injection to terminate advance of said ram at said programmed velocity under said ram injection pressure when said cavity pressure reaches a predetermined level, said program means being further responsive to said second pressure transducer output during plasticization for regulating the pressure from said variable pressure source at a level to establish said predetermined back pressure on said ram during plasticization, whereby said variable hydraulic pressure source for establishing said injection and back pressures during injection and plasticization is under joint control of both said cavity pressure transducer and said cylinder pressure transducer.

10. The control system of claim 9 further comprising:
a transducer associated with said ram screw for providing a signal correlated to actual ram screw velocity,
a servovalve and a pump incorporated in said variable hydraulic pressure source, said servovalve having an inlet connected to said pump, a first outlet connected to said cylinder and a second outlet connected to a fluid reservoir, said servovalve being responsive to electrical signals for altering the sizes of said first and second outlets in inverse relation,
a first source of programmed electrical signals correlated to a programmed ram velocity during injection,
a second source of programmed electrical signals correlated to a programmed back pressure during plasticization,
said first and second programmed electrical signal sources being incorporated into said program means,
a first comparator incorporated into said program means responsive to said first signal source and ram screw velocity transducer for providing a velocity error signal to said servovalve to control the sizes of said valve outlets and the fluid flow to said cylinder via said first valve outlet and the pressure thereof for maintaining the ram screw velocity at the programmed ram screw velocity,
said comparator being ineffective to control ram velocity when said cavity pressure reaches said predetermined level as sensed by said first pressure transducer,
a second comparator incorporated into said program means and responsive to said second signal source and said second pressure transducer for providing a back pressure error signal to said servovalve to control the sizes of said first outlet and the pressure in said cylinder in accordance with the programmed back pressure.

11. The control system of claim 10 wherein said program means further comprises:
a third source of electrical signals correlated to a predetermined holding pressure to be applied to said ram between injection and plasticization, and
a third comparator responsive to said third signal source and said second pressure transducer for providing a hold pressure error signal to said servovalve to control the sizes of said first and second outlets and hence the hold pressure in said cylinder in accordance with said predetermined holding pressure applied to said ram between injection and plasticization, said third comparator being effective to initiate control of said servovalve when said cavity pressure reaches said predetermined level as sensed by said first pressure transducer.

12. In an injection machine having a ram screw which during injection advances under an injection pressure to inject a plasticized charge into a molding cavity and during plasticization simultaneously rotates and retracts against a back pressure to plasticize a charge, a control system comprising:
means to generate said injection pressure and apply it to said ram screw during injection to advance said ram screw and inject said charge,
means to generate said back pressure and apply it to said ram screw during plasticization, means to rotate said ram screw during plasticization, and control means controlling said back pressure generating means for varying the level of said back pressure during plasticization whereby the plasticized charge is given a predetermined temperature profile along its length in accordance with the manner in which said back pressure is varied during plasticization, said means to generate said injection and back pressures including:

a single servovalve under control of electrical signals, said servovalve having an inlet connected to a source of pressurized fluid, a first outlet connected to said ram screw and a second outlet connected to a fluid reservoir, said outlets being inversely variable in size dependent on the magnitude of the electrical signal input to said servovalve during plasticization, a programmed source of electrical back pressure signals correlated to the desired programmed back pressure, a pressure transducer responsive to the actual injection and back pressures on said ram screw during injection and plasticization, respectively, a first comparator responsive to said pressure transducer during plasticization and said programmed back pressure signal source for generating a back pressure error signal, said error signal being input to said servovalve during plasticization for controlling said ram screw back pressure, a source of electrical signals correlated to said injection pressure, and a second comparator responsive to said pressure transducer during injection and said injection pressure signal source for generating an injection pressure error signal, said injection pressure error signal being input to said servovalve during injection, whereby the injection pressure and back pressure applied to said ram during injection and plasticization is achieved with a single servovalve under sequential control of injection pressure and back pressure error signals developed by comparing injection and back pressure signals correlated to desired injection and back pressure levels against ram screw pressure transducer signals correlated to actual injection and back pressure levels.

13. In an injection machine having a ram screw which luring injection advances under an injection pressure to inject a plasticized change into a molding cavity and during plasticization simultaneously rotates and retracts against a back pressure to plasticize a charge, a control system comprising:

means to generate said injection pressure and apply it to said ram screw during injection to advance said ram screw and inject said charge, means to generate said back pressure and apply it to said ram screw during plasticization, means to rotate said ram screw during plasticization, and control means controlling said ram screw rotating means for varying the speed of said ram screw during plasticization whereby the plasticized charge is given a predetermined temperature profile along its length in accordance with the manner in which said ram screw speed is varied during plasticization, said means to generate said injection and back pressures including:

a single servovalve under control of electrical signals, a source of electrical back pressure signals correlated to the desired back pressure, a source of electrical injection signals correlated to the desired injection pressure, a pressure transducer responsive to the actual injection and back pressures on said ram screw during injection and plasticization, respectively, comparison means responsive to said transducer signals and said signal source to generate injection and back pressure error signals correlated to the difference between said desired injection and back pressures and the actual injection and back pressures, said injection and back pressure error signals being sequentially input to said servovalve during injection and plasticization, respectively, to maintain said injection and back pressures on said ram screw at the desired levels, whereby the injection pressure and back pressure applied to said ram during injection and plasticization is achieved with a single servovalve under sequential control of injection pressure and back pressure error signals developed by comparing injection and back pressure signals correlated to desired injection and back pressure levels against ram screw pressure transducer signals correlated to actual injection and back pressure levels.

* * * * *